United States Patent [19]

Miller et al.

[11] Patent Number: 4,505,593
[45] Date of Patent: Mar. 19, 1985

[54] BATTER MIXER WITH WATER METER

[75] Inventors: Michael E. Miller, Bellevue; Fred Fetzer, Strongsville, both of Ohio

[73] Assignee: Stein Associates, Inc., Sandusky, Ohio

[21] Appl. No.: 514,014

[22] Filed: Jul. 15, 1983

[51] Int. Cl.³ .............................................. B01F 15/02
[52] U.S. Cl. .................... 366/152; 366/160; 366/179; 366/182; 366/191; 366/314
[58] Field of Search ................ 222/20; 366/151, 152, 366/160, 162, 167, 168, 177, 179, 182, 189, 191, 194, 314, 192

[56] References Cited

U.S. PATENT DOCUMENTS

| 1,464,877 | 8/1923 | Kirk | 366/192 |
| 2,846,200 | 8/1958 | Jamison | 366/162 |
| 3,507,420 | 4/1970 | Nelson et al. | 222/20 |
| 3,510,108 | 5/1970 | Yego | 366/167 |
| 3,606,274 | 9/1971 | Nelson | 366/314 |
| 3,995,839 | 12/1976 | Zingg | 366/167 |
| 4,259,022 | 3/1981 | Folland | 366/152 |

FOREIGN PATENT DOCUMENTS 2723894  11/1978  Fed. Rep. of Germany .......... 494/7

Primary Examiner—Robert W. Jenkins
Assistant Examiner—Arthur D. Dahlberg
Attorney, Agent, or Firm—Baldwin, Egan, Walling & Fetzer

[57] ABSTRACT

A batter mixer for mixing a dry powder batter mix with a predetermined quantity of liquid which comprises an upright open top housing having a mixing chamber therein, means connecting the mixing chamber to a source of fluid, fluid control means in circuit with the connecting means being responsive to the flow of fluid therethrough to accurately measure and control a selected quantity of fluid flowing into the chamber, said chamber having openable cover means for providing ready access to the interior thereof for deposition of dry powder batter mix therein, and mixing means in the chamber for thoroughly mixing said selected quantity of fluid and batter mix.

8 Claims, 6 Drawing Figures

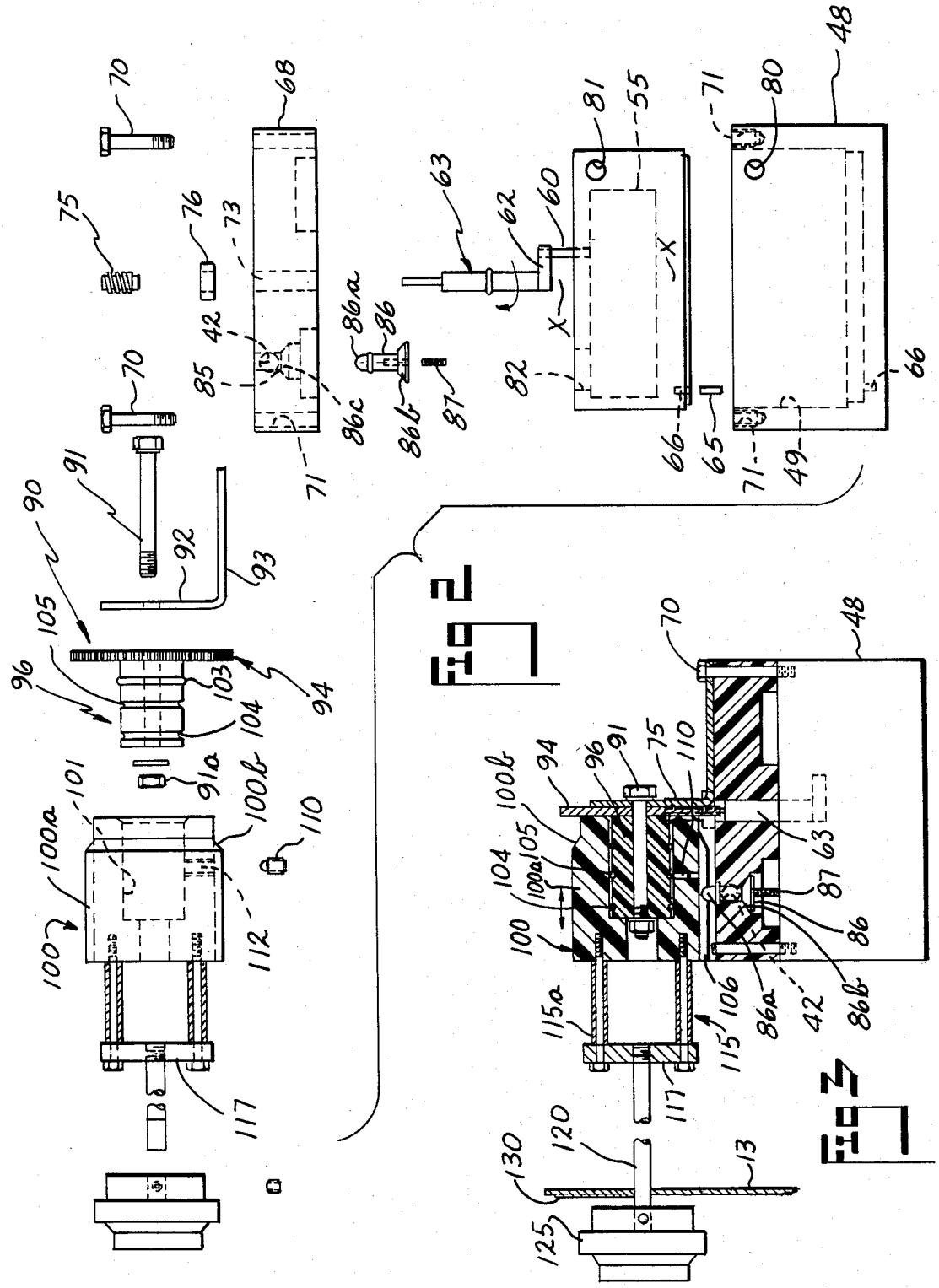

BATTER MIXER WITH WATER METER

This invention relates to a new and novel batter mixer especially designed to accurately mix a predetermined quantity of dry powder batter mix with a predetermined measured quantity of water to provide a liquid batter being uniform in liquid mixture from batch to batch for use in batter-breading coating of food products preparatory to cooking the same.

Heretofore, in making a liquid batter mix for coating food products such as chicken parts or fish patties, and the like, preparatory to sequentially breading and cooking the same, a quantity of dry powder batter mix is disposed in a suitable mixing container and water is added in successive quantities until the desired liquid mixture is obtained. Understandably, depending upon the skill of the person mixing these components, a difference in mixture consistency oftentimes occurs between batches resulting in a difference in the quality of the resulting cooked products.

BRIEF DESCRIPTION OF THE INVENTION

The present invention is directed to a batter mixer which includes a receptacle for mixing a predetermined volume of water with a preselected quantity of dry powder batter mix to provide repeatable uniform batches of liquid batter mix for use in the coating of food products preparatory to cooking the same.

In the preferred embodiment herein, the receptacle is of square cross-section carried on a suitable frame like support and had an open upper end into which predetermined quantities of dry powder batter mix and water are deposited to be mixed therein. Provision is made for taking the fluid batter mixture out of the receptacle and into a suitable container for use in coating food products.

It is therefore a primary object of the present invention to provide a new and novel batter mixer for mixing predetermined quantities of water and a dry powder batter mix to enable successive batches of uniform liquid mixture.

Another object of the present invention is to provide a novel batter mixer for mixing predetermined quantities of dry batter mix and water to provide a uniform fluid batter-water mixture and which mixer is easily and efficiently operable to provide successive batches of said fluid batter-water mixture of accurately uniform composition.

Other objects and advantages of the batter mixer of the present invention will be apparent to one skilled in the art to which it relates, and upon reference to the following description of a preferred embodiment which is illustrated in the accompanying drawings wherein:

DESCRIPTION OF DRAWINGS

FIG. 2 is an expanded view of the component assembly of the water metering unit for the batter mixer;

FIG. 3 is a side view partly in section of the water metering unit in its assembled condition.

DESCRIPTION OF THE ILLUSTRATED EMBODIMENT

Figure 1:
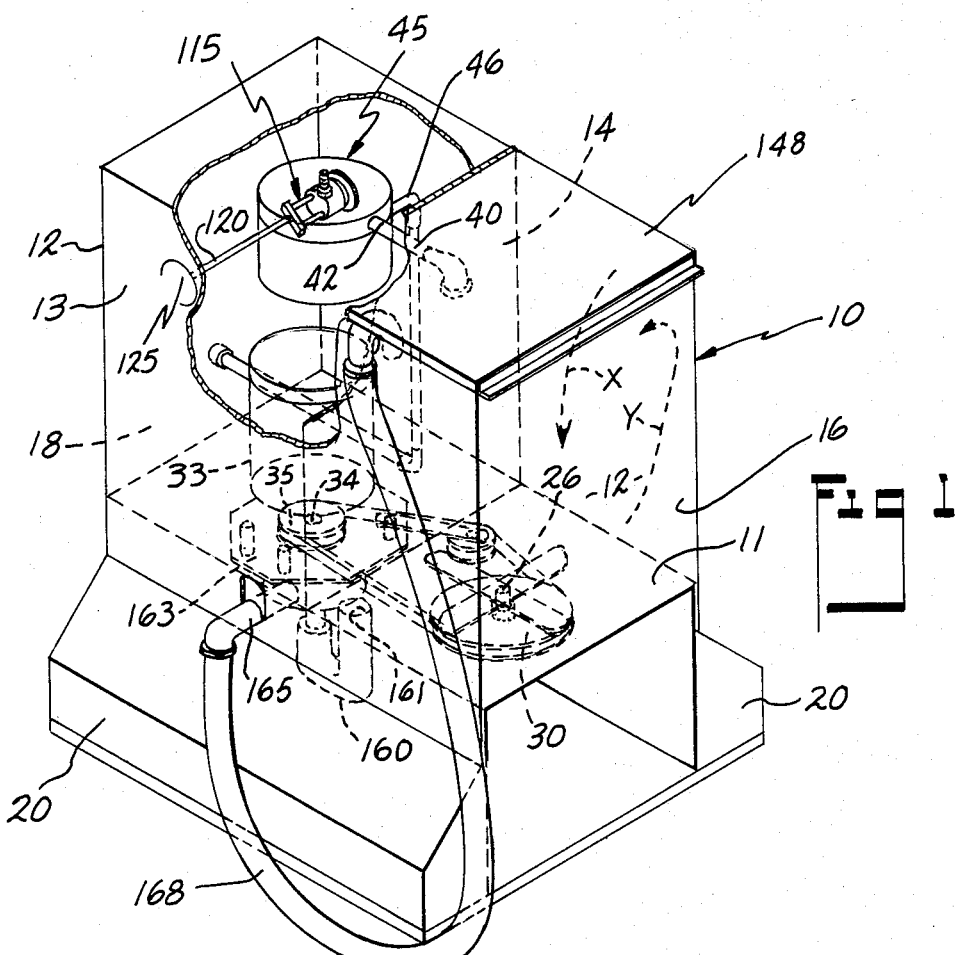
FIG. 1 is a perspective view of the batter mixer of the present invention with parts of the outer housing and receptacle removed to show underlying structure and component parts thereof, several of which are illustrated in dotted lines.
Figure 5:
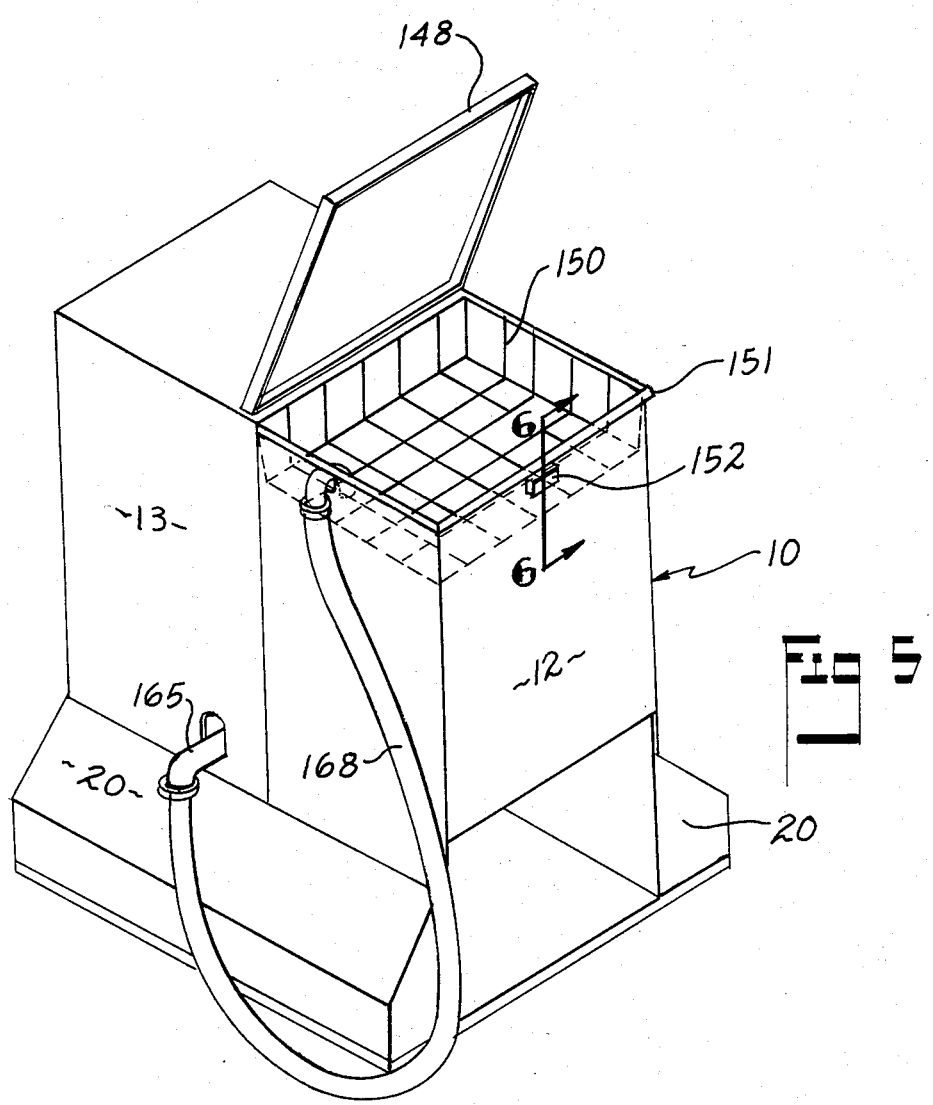
FIG. 5 is a perspective view of the batch mixer with the cover of the mixing chamber open to show the safety basket or cage mounted thereon.

With reference now directed particularly to FIGS. 1 and 5, the batter mixer of the present invention is box-like in overall configuration comprising a housing identified in its entirety at 10 which is substantially parallelepiped in contour and having a base 11 and opposed end walls 12 and side walls 13 extending vertically upwardly therefrom.

Support members 20 are suitably attached to the side walls 13 and stabilize the housing in its vertical upright position.

An inner upstanding wall 14 is disposed within housing 10 and divides the same into two compartments 16 and 18, compartment 16 defining a mixing chamber and compartment 18 accommodating several motor and pump components as will be later described.

The base 11 and adjoining end walls 12, side walls 13 and inner wall 14 are suitably joined together as by welding or the like to assure that the mixing chamber 16 is liquid-tight and capable of receiving a suitable quantity of water such as for example 100 pounds or approximately 1.6 cubic feet.

A mixing paddle-like impeller 25 is mounted on shaft 26, the latter being suitable rotatably attached in the base 11 and projecting upwardly therefrom into the chamber 16. Shaft 26 also extends below the base 11 and an exteriorly grooved driven wheel or pulley 30 is mounted thereon.

Pump motor 33 is disposed in compartment 18 such that its drive shaft 34 is disposed in the same vertical plane as impeller shaft 26. Drive pulley 35 is carried on shaft 34 and a suitable endless belt 37 extends around the driven wheel 30 and drive pulley 35 and hence is effective to rotatably drive the mixing impeller 25.

Figure 4:
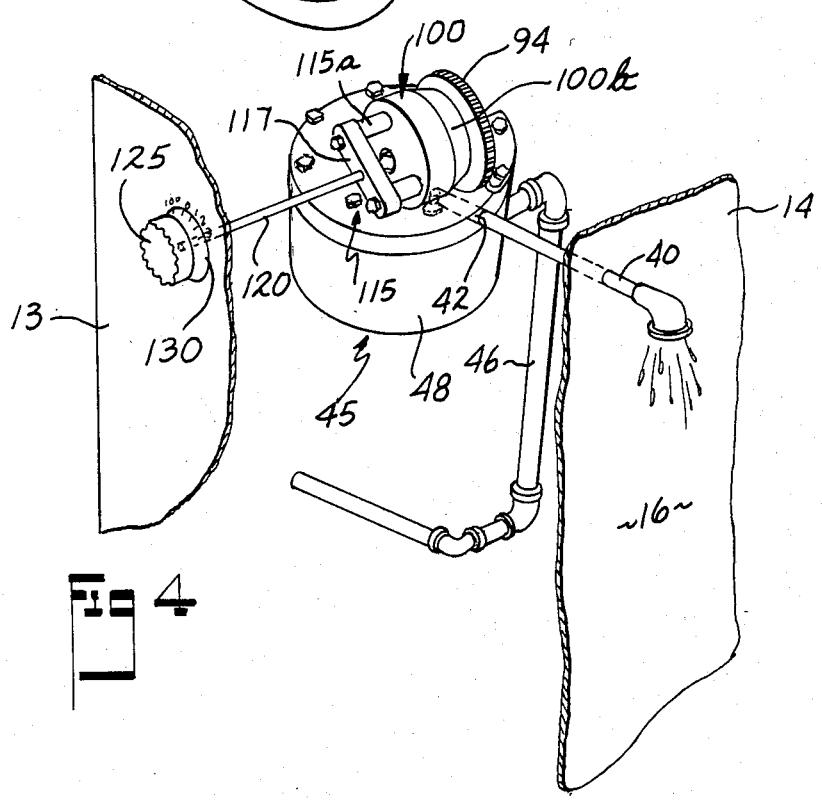
FIG. 4 is a fragmentary perspective view showing the water metering unit disposed within the mixer housing.

A source of water is made available to the mixing chamber 16, and for this purpose, pipe 40 has its one end extended through partition wall 14 and projecting downwardly into mixing chamber 16. As seen in FIGS. 1 and 4, the opposite end of said pipe 40 connects to the outlet 42 of a water metering unit 45, and a water supply pipe 46 connects at its one end to the water inlet of said device, and at its opposite end to a suitable water source.

The water metering unit 45 is operable to accurately measure and provide a predetermined quantity of water to the mixing chamber 16.

As best seen in FIGS. 1-3, the water metering unit 45 includes a cylindrical body 48 formed centrally with an interior cavity or recess 49 into which a water measuring or metering chamber 50 of conventional design is disposed. One such measuring chamber 50 adaptable to the present structure is commercially available under the name Rockwell SR type manufactured by the Rockwell International Company of Pittsburgh, Pa. This type of measuring chamber 50, as seen in FIG. 2, includes a piston element or the like 55 which moves cyclically about its axis X—X in response to a predetermined quantity of water passing through the chamber 50. In the present assembly of chamber 50, the piston element is especially designed to rotate one complete cycle or 360° for each 0.64 pounds or 0.01 cubic foot of water passing through the chamber.

Connector pin or rod 60 is operatively connected on its one end, as schematically shown in FIG. 2, to the piston element 55, and extends upwardly therefrom and at its opposite end drives transverse arm 62 of crank member 63.

The metering chamber 50 is disposed within housing cavity 49 and keyed thereto by pin 65 extending into blind holes 66 formed in the adjoining surfaces of the housing 48 and chamber 50.

A cover 68 is mounted over the housing 48 and secured thereat by bolts 70 threadedly extending into blind interiorly threaded holes 71 formed in the upper face of the housing 48.

A bore 73 is formed centrally through cover 68 and the crank member 63 extends therethrough. The free end of said crank member 63 mounts a worm 75 which seats upon collar 76.

Water inlet port 80 is formed in the wall of housing and communicates with inlet port 81 formed in the chamber 50 to provide a source of water to the latter.

Outlet passage 82 is provided in metering chamber 50 and communicates with outlet port 85 formed in the cover 68.

A poppet valve 86 is interposed between the cover 68 and chamber 50 and is urged by coil spring 87 upwardly toward outlet port 85.

The poppet valve 86 is formed with a conical seat 86b which seats upon port surface 86c of like contour which is effective to close said outlet port 85.

As best seen in FIG. 3, in the closed valve position, the rounded end or follower element 86a of said poppet valve 86 projects upwardly above and upper end of port 85.

As also seen in FIG. 3, the aforementioned outlet 42 connects with port 85 above valve seat 86b, said outlet 42 connecting, in turn, with one end of conduit 40.

In a manner now to be described, a measured quantity of water is passed through the water metering device 45 and out through port 85, outlet 42 and conduit 40 into the mixing chamber 16.

To accomplish this, a worm gear assembly 90, as best seen in FIGS. 2 and 3, is rotatably supported on the barrel or shank of screw 91 which, in turn, is carried on the upstanding leg 92 of an L-shaped bracket 93, said assembly being securely fastened thereto by nut 91a. Bracket 93 is fastened by screw 70 to the upper surface of housing cover 68.

Worm gear assembly 90 has worm gear 94 attached to or otherwise centrally formed on one end of barrel or hub 96. As assembled on the housing cover 68, worm gear 94 meshes with worm 75 carried on crank 63.

A cylindrical cam member 100 is formed with a cavity 101 extending partially centrally therethrough and opening at one end thereof into which hub 96 is slidably disposed. O-ring 103 carried on the periphery of hub 96 is in pressure engagement with the wall of cavity 101 and thus resiliently locks the cam member 100 to gear assembly 90 while permitting the cam member to be moved longitudinally along the surface of said hub.

Annular grooves 104 and 105 formed on the surface of hub 96 in spaced relation to each other each coact with a ball plunger 110 disposed in aperture 112 in cam member 100 effective to selectively releasably lock the cam member 100 in several longitudinal adjusted positions on the hub 96.

As seen in FIG. 3, which is also the closed position of poppet valve 86, the cam member 100 is formed with a longitudinally extending recess 106, into which the rounded end or follower element 86a is disposed thus permitting the poppet valve to move to its closed position under the influence of spring 86 and pressure of water.

Bridge member 115, FIG. 3, has two spaced legs 115a each being securely fastened at one end to cam member 100 and which extend perpendicularly outwardly therefrom. Plate member 117 is suspended between the opposite ends of legs 115a and one end of rod 120 is threadedly secured centrally thereto. Rod 120 projects outwardly through the side wall 13 of the housing 10, and knob 125 is securely fastened to the end of the rod 120 whereupon rotation of said knob causes the cam member 100 to be rotated in the same radial direction. Likewise, by pulling outwardly on knob 125 the cam member 100 may be selectively positioned in either of the two positions on hub 96 as defined by the annular grooves 104 and 105.

With this assembly, it is operable to measure an exact quantity of water as it flows through the metering unit 45.

This is accomplished by having a preselected gear ratio between the lead of worm 75 and the number of teeth on worm gear 94.

In the present embodiment, it is intended to measure precisely 100 pounds of water per each revolution of worm gear 94.

And, as aforesaid, 0.64 pounds of water pass through the metering chamber 50 per each revolution of the piston element 55. Hence, the gear ratio between worm 75 and worm gear 94 should be selected to be 1 to 156.25 so that the metering chamber 50 will rotate 156.25 times to precisely measure 100 pounds of water.

As will also be realized, the gear ratio between worm 75 and worm gear 94 may be selective for any other desired measured quantity of water. Likewise, instead of measuring pounds of water, the measurement scale thereof may be in equivalent terms of cubic feet, as for example with the gear ratio of 1 to 156.25 one revolution of worm gear 94 would measure 1.56 cubic feet of water passing through metering chamber 50.

As seen in FIGS. 2 and 3, the cylindrical peripheral surface 100a of cam member 100 angles inwardly adjadent the right end thereof toward the center to thus form annular cam surface 100b.

As seen in FIG. 3, the recess 106 in which the rounded end 86a of poppet valve 86 is disposed in the closed valve position, is also terminated at its right end by the aforesaid cam surface 100b.

With this construction, as the cam member 100 is pulled to the left with knob 125 and shaft 120 until the ball plunger 100 snaps into annular groove 104 of hub 96, the rounded end 86a of poppet valve is free of recess 106.

When this occurs, knob 125 may be rotated to move said recess 106 out of longitudinal alignment with respect to poppet valve 86. Thereafter, cam member 100 may be pushed to the right by force exerted on knob 125 sliding side cam member over hub 96 against the resistance of O-ring 103 whereby the rounded end 86a of poppet valve 86 is pushed downwardly, as viewed in FIG. 3, as it rides over cam surface 100b. When the cam member 100 has been thus moved to the right as shown in FIG. 3, the rounded end 86a of poppet valve 86 is in contact with the surface 100a of cam member 100, and the poppet valve 86 is thereby retained in its open position connecting the water output of metering chamber 50 to open port 85, outlet port 42, and conduit 40 into the mixing chamber.

A suitable calibrated dial as depicted at 130 in FIG. 3, underlying knob 125 may be utilized when rotating said knob in its extended position to locate the rounded end 86a of the poppet valve in juxtaposition to one edge of the longitudinal recess 106 on cam member 106.

Thereafter, the knob 125 is pushed to its FIG. 3 position, and with the source of water flowing through conduit 46 into the metering unit 45, the metering chamber 50 will be rotatably driven by said inlet water flow and is effective to rotate the connected worm 75 and worm gear 94 and rotate the cam member 100 by reason of the resilient-clutch like connection between hub 96, O-ring 103 and said cam member 100.

The rotation of said cam member is in such direction as to move the recess 106 away from the rounded end 86a of the poppet valve whereupon said rounded end rides over the smooth peripheral surface 100a of the cam member.

The worm gear 94 is thus incrementally rotated per each rotation of the worm 75, and as aforementioned, with the gear ratio of 1 to 156.25 therebetween, after 156.25 rotations of the worm 75 the gear 94 has been advanced through 360° or one rotation and the rounded end 86a of the popper valve approaches the opposite edge of the recess 106a, and thence snaps into said recess whereupon said poppet valve 86 immediately closes valve port 86 and outlet 42 to thus stop the flow of water into the mixing chamber 16.

And, as aforementioned, the assembly as just described operates to permit 100 pounds of water to flow into the mixing chamber 16.

After the desired quantity of water has been put into the mixing chamber 16, the impeller 25 is then actuated, preferably in such manner as to create a vortex drawing the water down in the center in the direction of arrow X and upwardly along the sides of the chamber in the direction of arrow Y.

The cover 148 of the mixing chamber may then be raised and a suitable quantity of dry powder batter mix, as referred to in the art, may be poured into the mixing chamber and vortex and thus thoroughly mixed with said water resulting in a liquid batter mix of repeatable consistency.

Figure 6:
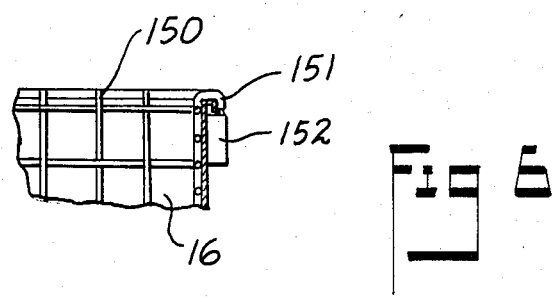
FIG. 6 is a fragmentary view of the safety switch taken on line 6—6 of FIG. 5.

In order to prevent injury to the attendant, a somewhat shallow basket or cage 150 as seen in FIGS. 5 and 6 constructed of a suitable material such as stainless steel wire may be inserted into the open top of the mixing chamber and is constructed to permit the powder mix to freely fall into the chamber without affecting the mixing action of the impeller while also being of such mesh as to prevent the attendant from inadvertently extending his hands into the chamber which might contact the impeller 25 and cause an injury thereto.

As seen in FIG. 6, the basket 150 is provided with a downwardly open peripheral rim 151 which fits over the top edge of the mixing chamber 16 being thus suspended therefrom.

An additional safety feature may also be provided by having a conventional switch unit 152 attached to the side wall of the chamber 16 and engageable by basket rim 151 to its actuated position.

As is understood in the art such actuation may be accomplished by physically moving a switch element such as a toggle to its closed switch position or by the magnetic attraction of the rim of the basket effective to actuate the switch.

By inserting this safety switch 152 into the control circuit (not shown) for the impeller motor 33, in a manner known in the art, the motor 33 and impeller 25 will not be actuated until the basket 150 is positioned within the open end of the mixing chamber 16 and its rim 151 engages the safety switch 152.

After the water and dry powder mix has been thoroughly mixed the resultant mixture may then be transferred to a suitable container or food processing equipment for subsequent use.

For this purpose, as seen in FIG. 1, a U-shaped outlet conduit 160 has its one end suitably attached to an aperture 161 formed in the base of the mixing chamber 16. The opposite end of said conduit 160 connects to the input of pump unit 163 of motor 33, and one end of conduit 165 connects to the outlet of said pump unit 163. A suitable length of flexible hose or the like 168 has its one end connected to conduit 165 and its opposite end mounts a suitable nozzle 170. When it is desired to drain the mixing chamber 16 pump motor 33 may be energized to actuate pump unit 163 whereby to pump the liquid batter mixture through hose 168 and nozzle 170 into the container of a food processing equipment.

Having thus described a preferred embodiment of batter mixer, it will be realized that various modifications thereof may be undertaken without departing from the scope of the inventive concept as is defined in the claims.

I claim:

1. A batter mixer for mixing a dry powder batter mix with a predetermined quantity of liquid comprising, a housing having a mixing chamber, means for connecting said chamber to a source of fluid, means in fluid circuit with said connecting means being responsive to the flow of fluid therethrough to accurately measure and to selectively control a selected one of a multitude of different quantities of fluid for flowing into said chamber, said chamber having means for providing ready access to the interior thereof for deposition of dry powder batter mix therein, and mixing means in said chamber for thoroughly mixing said selected quantity of fluid and batter mix, and wherein said mixing chamber is of square configuration in plan and open at the top thereof providing said ready access means for said deposition of batter mix therein and providing for ready cleaning of said chamber, and wherein openable, imperforate cover means are provided to selectively close the open top of said chamber to prevent egress of the mixture of batter mix and fluid therefrom, and wherein said second mentioned means comprises a fluid metering chamber connected in series circuit between the source of fluid and said mixing chamber, said fluid metering chamber being operable to sense the flow of fluid therethrough and to accurately measure the quantity thereof, said fluid metering chamber having means repeatably actuated in response to a preselected quantity of fluid passing therethrough, the last mentioned means comprising a piston element cyclically movable about an axis in said fluid metering chamber and responsive to a predetermined quantity of water passing through said fluid metering chamber, means connected to the repeatably actuated means being operable to pre-set said actuated means and permit a predetermined quantity of fluid to pass therethrough and into said mixing chamber, and wherein the means connected to the repeatably actuated means comprises shaft means rotatably movable by said actuated means, gear means connectable with said shaft means, and adjustment means connectable to said gear means for pre-setting said gear means and enabling said gear means to be rotated in response to a preselected volume of fluid passing through said metering chamber, stop means connectable to the gear means and in fluid circuit with the source of fluid, and being actuated in response to the passage of a preselected volume of fluid passing into the mixing chamber to stop the fluid flow, said means connectable with said gear means comprising a hub attached to said gear means, cam means resiliently attached to said hub, and valve means operatively connected to said cam means and in fluid circuit between the source of fluid and said mixing chamber, said resilient connection between said hub and said cam means comprising an O-ring encircling said hub and adapted for frictional engagement with the defining interior of a receiving cavity in said cam means and permitting axial movement of said cam means relative to said hub to selectively uncouple and to selectively recouple said cam means from and to said hub but preventing relative rotational movement between said cam means and said hub in the coupled condition of said cam means and said hub, said cam means in said coupled condition of said cam means and said hub being actuatable to operate said valve means in response to a preselected volume of fluid entering into the mixing chamber effective to stop the fluid flow, said valve means of said stop means comprising a poppet valve which is held by said cam means in open condition to permit fluid flow from said metering chamber via said first mentioned means into said mixing chamber, but which automatically moves to closed position when said cam means is rotated by said hub and attached gear means to a position where said poppet valve registers with a recess on the exterior of said cam means, to thus stop the fluid flow from said metering chamber into said mixing chamber.

2. A batter mixer as is defined in claim 1 and wherein the connecting means connects a source of water to said chamber.

3. A batter mixer as defined in claim 1 and wherein safety means are provided coacting with said open top to prevent inadvertent entry through the access means and into the mixing chamber, said safety means being covered by said cover means in the closed condition of the latter.

4. A batter mixer as defined in claim 3 and wherein the safety means comprises a cage-like receptacle removably mountable into the access means of the mixing chamber and being operable to limit entry into the same.

5. A batter mixer as defined in claim 4 and wherein switch means are operable with the receptacle to enable the actuation of the mixing means only when the receptacle is in place in the access means.

6. A batter mixer as defined in claim 1 and wherein means are provided to withdraw the fluid batter mix from the mixing chamber.

7. A batter mixer as defined in claim 6 and wherein the withdrawal means is a fluid pump.

8. A batter mixer in accordance with claim 1 wherein said housing includes an inner upstanding wall dividing said housing into said mixing chamber which is open only at the top thereof and a separate compartment, said mixing chamber being defined by opposed side walls, a bottom wall, said inner wall and an outer end wall, said cover means encompassing the upper ends of said inner wall and said outer end wall and said side walls in the closed condition thereof, and when in open position providing ready access to the interiors of all of said walls, said separate compartment containing the first and the second mentioned means, said mixing means including a motor disposed in said separate compartment and an impeller mounted in generally central position on said bottom wall interiorly of said mixing chamber, means operatively coupling said motor to said impeller for driving said impeller, said coupling means being disposed exteriorly of said mixing chamber, and a drain aperture connected to pump means for withdrawing fluid batter mix from said mixing chamber, and a manual control coupled to said second mentioned means and disposed exteriorly of said housing for initiating the flow of fluid via said first mentioned means to said mixing chamber.

* * * * *